United States Patent
Freedman et al.

(10) Patent No.: US 8,494,262 B2
(45) Date of Patent: Jul. 23, 2013

(54) TRANSFERRING COLORS FROM A SOURCE OBJECT TO A TARGET OBJECT

(75) Inventors: Daniel Freedman, Zikhron Ya'aqov (IL); Pavel Kisilev, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 13/114,736

(22) Filed: May 24, 2011

(65) Prior Publication Data

US 2012/0301028 A1    Nov. 29, 2012

(51) Int. Cl.
*G06K 9/00* (2006.01)
(52) U.S. Cl.
USPC .......................................................... 382/162
(58) Field of Classification Search
USPC ........... 382/162–170, 173, 254, 274; 358/1.9, 358/518–522; 345/589–604
See application file for complete search history.

(56) References Cited

U.S. PATENT DOCUMENTS

| | | | | |
|---|---|---|---|---|
| 5,307,182 A * | 4/1994 | Maltz | ............................ | 358/518 |
| 5,734,744 A * | 3/1998 | Wittenstein et al. | .......... | 382/166 |
| 6,259,428 B1 | 7/2001 | Ramchandani et al. | | |
| 7,317,843 B2 * | 1/2008 | Sun et al. | ...................... | 382/274 |
| 7,693,341 B2 * | 4/2010 | Pettigrew et al. | ............. | 382/254 |
| 8,009,911 B2 * | 8/2011 | Singaraju et al. | ............. | 382/173 |
| 8,022,964 B2 * | 9/2011 | Pettigrew et al. | ............. | 345/594 |
| 8,031,962 B2 * | 10/2011 | Pettigrew et al. | ............. | 382/254 |
| 8,340,415 B2 * | 12/2012 | Hoppe et al. | ................ | 382/167 |
| 2009/0060333 A1 | 3/2009 | Singaraju et al. | | |

OTHER PUBLICATIONS

Yao Li, et al., "Fast Colorization Using Edge and Gradient Constrains," 7 pages.
Jian Guan et al., "Interactive Image Segmentation Using Optimization With Statistical Priors," 14 pages.
Daniel Freedman, et al. "Object-to-Object Color Transfer: Optimal Flows and SMSP Transformations," IEEE Conference on Computer Vision and Pattern Recognition (CVPR), Jun. 23, 2010.
Hong Li, "Image Inpainting Based on Scene Transform and Color Transfer," Abstract, http://portal.acm.org/citation.cfm?id=1751679. 1751978&coll=Portal&dl=GUIDE&CFID=100051734& CFTOKEN=35743910, 1 page, May 7, 2010.

* cited by examiner

*Primary Examiner* — Ishrat I Sherali

(57) ABSTRACT

A technique includes using a processor-based machine to determine a discrete color flow transformation to map target colors of a target object to source colors of a source object based at least in part on a first histogram indicating a color distribution of the target object and a second histogram of a color distribution indicating the source object. The technique includes determining a continuous color flow transformation to map the target colors to the source colors based at least in part on the discrete color flow transformation; and transforming the target colors of the target object to generate a third object based at least in part on the continuous color flow transformation.

20 Claims, 4 Drawing Sheets

TRANSFERRING COLORS FROM A SOURCE OBJECT TO A TARGET OBJECT

BACKGROUND

In the course of editing an image, a user may want to transfer the colors of a particular object (called the "source object") that is not part of the image to an object (called the "target object") of the image. Stated differently, the source object may have a general color scheme, which the user desires to transfer to the target object. This task is rather challenging, however, due to the source and target color sets each typically containing a wide range of colors, with each of these colors typically having multiple shades.

DETAILED DESCRIPTION

Figure 1:
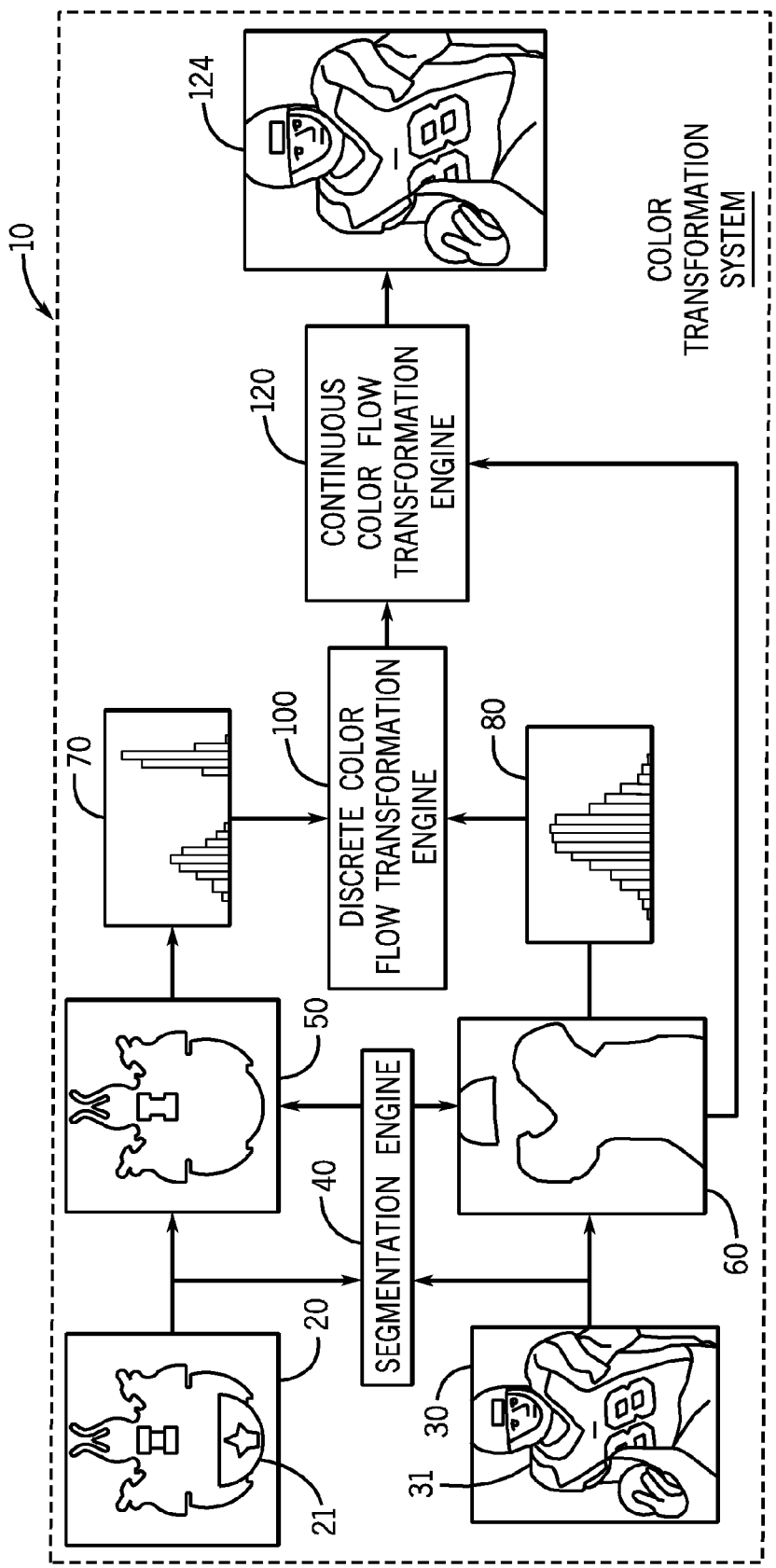
FIG. 1 is a schematic diagram of a color transformation system according to an example implementation.

Referring to FIG. 1, a color transformation system 10 may be used for purposes of transferring colors that exist in a source image 20 to one or more regions of a target image 30. More specifically, the source image 20 may contain a particular source object 21, which contains colors that a user desires to transfer to a target object 31 of the target image 30. In this manner, a user identifies the source 21 and target 31 objects through scribbling, a bounding box or other user input, which supplies seed values to the color transformation system 10 indicative of subsets of pixels that are contained within the objects 21 and 31. Based on these seed values, a segmentation engine 40 of the color transformation system 10 identifies the boundaries of the source 21 and target 31 objects to thereby extract the objects 21 and 31 from the respective images 20 and 30. As a non-limiting example, the segmentation engine 40 may apply an auto-segmentation technique that is similar to the technique disclosed in U.S. patent application Ser. No. 13/114,690, entitled "Segmenting An Image," which is filed concurrently herewith and is hereby incorporated by reference in its entirety. The segmentation engine 40 may use other segmentation schemes, in accordance with other implementations.

Regardless of the segmentation technique that is used, the segmentation engine 40 produces segmented images 50 and 60, which correspond to the source 21 and target 31 objects. In accordance with the systems and techniques that are disclosed herein, the color transformation system 10 processes the segmented images 50 and 60 for purposes of transferring the colors from the source object 21 to the target object 31 to produce a transformed object 124, which is essentially the target object 31 with the color scheme of the source object 21.

In general, the color transformation system 10 includes a discrete color flow transformation engine 100 and a continuous color flow transformation engine 120, which function as disclosed herein to generate the transformed object 124. In general, the discrete color flow transformation engine 100 generates a discrete color flow transformation to describe the transfer of color between the source 21 and target 31 objects based on histograms 70 and 80 that indicate the discrete color distributions of the segmented images 50 and 60, respectively.

It is noted that the histograms 70 and 80 may be generated by the discrete color flow transformation engine 100 or by another processing entity, depending on the particular implementation.

As described herein, the continuous color flow transformation engine 120 determines a continuous color flow transformation to describe the transfer of color between the source 21 and target 31 objects based on statistics of the discrete color flow transformation, and based on the determined continuous color flow transformation, the continuous color flow transformation engine 120 generates the transformed object 124.

Figure 2:
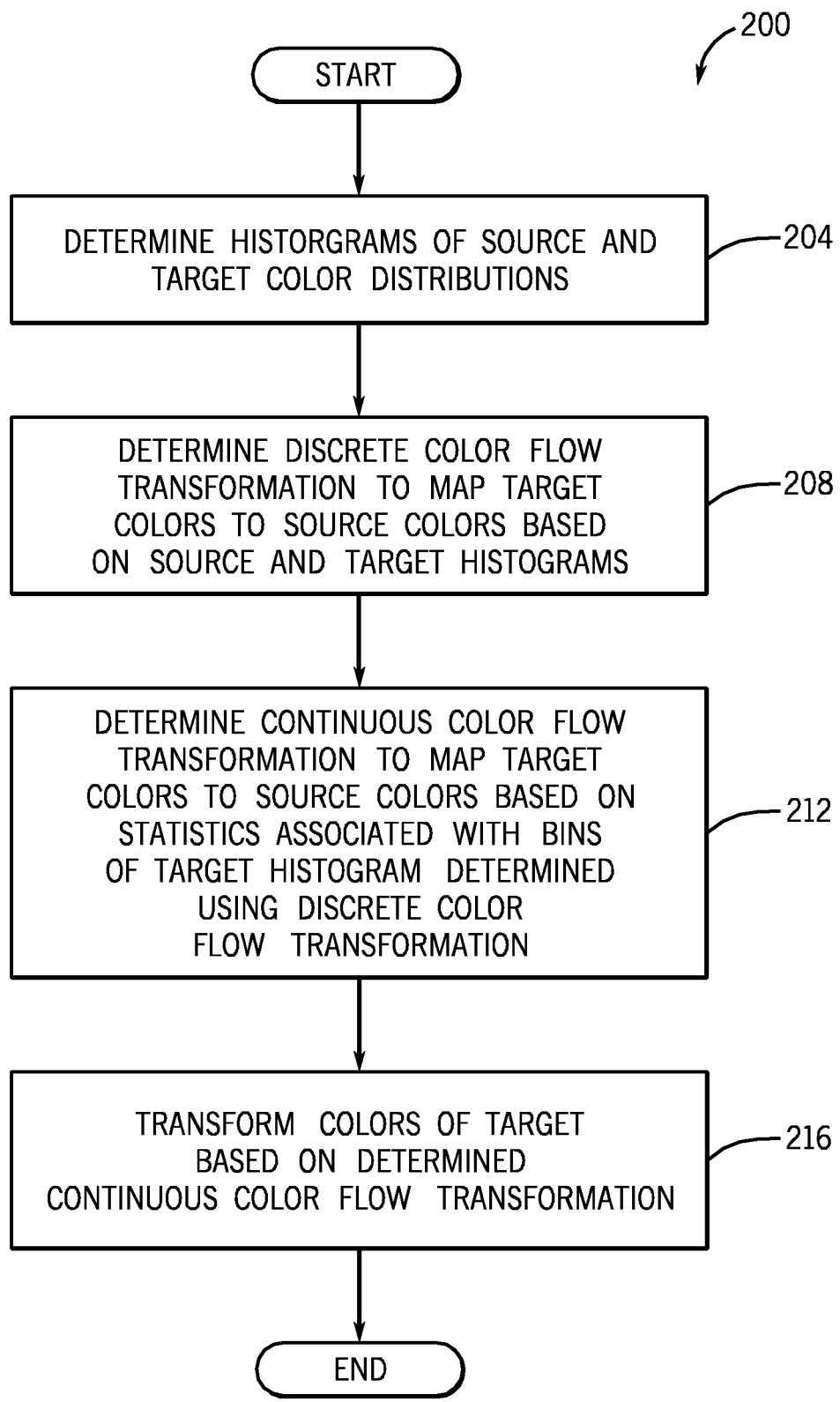
FIGS. 2 and 4 are flow diagrams depicting techniques to transfer colors between source and target objects according to example implementations.

More specifically, in accordance with example implementations, the components of the color transformation system 10 work in conjunction to perform a technique 200 that is generally depicted in FIG. 2. Pursuant to the technique 200, histograms of source and target color distributions are first determined, pursuant to block 204. Next, a discrete color flow transformation is determined (block 208) to map target colors to source colors based on these source and target histograms. A continuous color flow transformation is then determined, pursuant to block 212, to map the target colors to the source colors based on statistics, which are associated with bins of the target histogram and are determined using the discrete color flow transformation. The colors of the target object 31 may then be transformed based on the determined continuous color flow transformation, pursuant to block 216.

Turning now to the more specific details, in accordance with some implementations, the discrete color flow transformation engine 100 first determines a color flow, which describes, in discrete terms, the mapping of the source colors to the target colors. In general, the discrete target and source color distributions may be described as a list of histogram bins with non-zero probabilities, along with their probabilities. For example, the histogram for the target object 31 may be described as "$\{(t_i, p_i^t)\}_{i=1}^{n_t}$," where "$t_i$" represents the target bin-center; "$p_i^t$" represents the corresponding probability mass for that bin; and "$n_t$" represents the number of bins. In a similar manner, the histogram for the source object 21 may be expressed as, "$\{(s_j, p_j^s)\}_{j=1}^{n_s}$."

One way to generate a discrete transform that describes the mapping of the colors from the source object 21 to the target object 31 is by solving a specific problem called, "the transportation problem." In this approach, a flow between the target and source color distributions is represented "$f_{ij}$," where the indices i and j range over non-empty bins of the target and source color distributions, respectively. That is, the $f_{ij}$ flow may be thought out as the part of target bin i, which is mapped to source bin j.

To guide this mapping, a color distance called "$D(t,s)$" is determined between the target and source colors. The color distance $D(t,s)$ conveys how similar a target color is to a source color. As a non-limiting example, the color distance $D(t,s)$ may be the ordinary $L_2$ norm distance between red-green-blue (RGB) vectors. However, the $D(t,s)$ distance may take into account other factors. For example, if shadows are to be removed, a brightness-invariant distance may be used, which is described as follows:

$$D(t, s) = \left\| \frac{t}{\|t\|_1} - \frac{s}{\|s\|_1} \right\|_2, \quad \text{Eq. 1}$$

where an RGB representation of color has been assumed. Other color distances may be used, in accordance with other example implementations. The color flows $f_{ij}$ may be determined by minimizing an objective function, as described as follows:

$$\min_{\{f_{ij}\}} \sum_{i=j}^{n_t} \sum_{j=1}^{n_s} f_{ij} D(t_i, s_j), \quad \text{Eq. 2}$$

where the following constraints apply:

$$\sum_{j=1}^{n_s} f_{ij} = p_i^t \quad \text{Eq. 3}$$

$$i = 1, \ldots, n_t,$$

$$\sum_{i=1}^{n_t} f_{ij} = p_j^s \quad \text{Eq. 4}$$

$$j = 1, \ldots, n_s, \text{ and}$$

$$f_{ij} \geq 0. \quad \text{Eq. 5}$$

The goal of minimizing the above-described objective function set forth in Eq. 2 is to map the target colors $t_i$ to corresponding source colors $s_j$ in such a way that the color distance $D(t,s)$ between them is as small as possible. However, in practice, it may not be reasonably expected that each bin of the target distribution maps exactly to one bin of the source distribution. Therefore, the target bins may be distributed over several source bins, subject to the constraints imposed by Eqs. 3 and 4, which ensure a conservation of probability for both the target and source distributions.

Ensuring an exact conservation of probability may be too extreme, however, as this constraint assumes that the source and target regions contain exactly the same amounts of comparable colors. For example, an exemplary source object may contain 50% light red and 50% dark red colors; and the target object may contain 40% light blue colors and 60% dark blue colors. For this example, it is further assumed that it is desired to map target pixels with a given brightness to source pixels with a given brightness, independent of color; and it is also further assumed that the light blue and light red pixels have the same brightness as do the respective dark colors. The corresponding color distance is the brightness distance, which is "$D(t,s)=|\|t\|_1 - \|s\|_1|$," where "t" and "s" are RGB representations of color. In this case, by solving the above-described transportation problem, the conservation of probability constraints cause 10% of the dark blue section of the target image to appear in light red, which is not desirable.

To allow the source and target regions to contain disparate amounts of comparable colors, in accordance with exemplary implementations set forth herein, the conservation of probability constraints are relaxed by maintaining the constant imposed by Eq. 5, replacing the constraints expressed in Eqs. 3 and 4 with the corresponding constraints below:

$$p_i^t / \eta \leq \sum_{j=1}^{n_s} f_{ij} \leq \eta p_i^t \quad \text{Eq. 6}$$

$$i = 1, \ldots, n_t,$$

$$p_j^s / \eta \leq \sum_{i=1}^{n_t} f_{ij} \leq \eta p_j^s \quad \text{Eq. 7}$$

$$j = 1, \ldots, n_s, \text{ and}$$

adding the following equality constraint:

$$\sum_{i,j}^{n_t} f_{ij} = 1. \quad \text{Eq. 8}$$

In Eqs. 6 and 7, "$\eta$" is a parameter greater than or equal to one, which describes the slackness of the conservation constraints. The constraint that is set forth in Eq. 8, which was forced implicitly in the above-described transportation problem, is now made explicit.

The role of $\eta$ is described in the following theorem:
Consider the optimization problem with relaxed conservation constraints. Modify (Eq. 6) to read $$p_i^t / \eta + (1 - 1/\eta)\varepsilon \leq \sum_{j=1}^{n_s} f_{ij} \leq \eta p_i^t,$$

for some $\epsilon > 0$ ($\epsilon$ can be chosen arbitrarily small). Then:
if $\eta = 1$, the problem reduces to the ordinary transportation problem; and
if $\eta \to \infty$, then for a fixed i, the only j for which $f_{ij} > 0$ is $j = \arg\min_{j'} D(t_i, s_{j'})$ This theorem states that the optimization problem with relaxed conservation constraints interpolates between two cases: the transportation problem, in which the parameter $\eta$ is equal to one; and the case in which each target color $t_i$ flows entirely to the source color $s_j$, which is closest to it, according to the color distance $D(t_i, s_j)$ for the $\eta = \infty$ condition. In accordance with some exemplary implementations, the parameter $\eta$ is set to an intermediate value, such as two (as a non-limiting example). Other values may be used for the parameter $\eta$, in accordance with other example implementations.

The above-described optimization problem does not take into account the smoothness of the discrete color transformation. In this manner, it may be desirable for the color flows to be similar for similar target colors. This may be particularly advantageous, as the final, continuous color transformation is based on these flows; and a corresponding smoothness of the flows ensures that the continuous color transformation is also sufficiently smooth. Based on this criteria, the objective function expressed in Eq. 2 may be modified as follows, in accordance with example implementations:

$$\sum_{i=j}^{n_t} \sum_{j=1}^{n_s} f_{ij} D(t_i, s_j) + \gamma \sum_{i \neq i'} \omega_{i,i'} \left\| \frac{f_i}{p_i^t} - \frac{f_{i'}}{p_{i'}^t} \right\|_p, \quad \text{Eq. 9}$$

where "$f_i$" represents the vector "$[f_{i,1} \ldots f_{i,n_s}]_T$;" "$\|\cdot\|_p$" represents the p-norm; "$\omega_{i,i'}$" represents a measure of similarity of $t_i$ and $t_{i'}$ colors; and "$\gamma$" represents a weighting factor between the transportation and smoothness terms. For pairs i and i' with similar target colors, i.e., for pairs i and i' where $\omega_{i,i'}$ is large, the normalized flows $f_i \cdot /p_i^t$ and $f_{i'} \cdot /p_{i'^t}$ are similar. The reason for the normalization becomes apparent below but is explained briefly as follows. The normalized flow may be viewed as a probability distribution over source colors j, which correspond to a particular target color i. It is these probability distributions that are used for the final transformation, so it is these distributions that are desired to be smooth. In practice, a similarity measure of the form $\omega_{i,i'}=(d(t_{i,i'})+\epsilon)^{-\alpha}$ may be used, where "d" measures the distance between target colors; and "$\epsilon$" and "$\alpha$" are small positive parameters. Thus, the smoothed relaxed transportation problem may be set forth as follow:

$$\min f_{ij}\left(\sum_{i=j}^{n_t}\sum_{j=1}^{n_s}f_{ij}D(t_i,s_j)+\gamma\sum_{i\neq i'}\omega_{i,i'}\left\|\frac{f_i}{p_i^t}-\frac{f_{i'}}{p_{i'}^t}\right\|_p\right), \quad \text{Eq. 10}$$

subject to the constraints that are imposed by Eqs. 5, 6, 7 and 8. If the norm p in Eq. 10 is greater than or equal to one, the minimization problem is a convex problem, which may be solved efficiently. It is noted that if the norm p is equal to two, then Eq. 10 may be solved as a quadratic problem.

The continuous color flow transformation engine 120 converts the discrete color flow transformation into a continuous color flow transformation. This transformation relies on determining a transformation (called "ø"), which maps a vector random variable (called "$Z_1$") with a mean and covariance matrix ($\mu_1$, $\sigma_1$), such that the transformed random variable $Z_2=Ø(Z_1)$ has a mean and covariance matrix ($\mu_2$, $\sigma_2$). In accordance with exemplary implementations, affine transformations are used to describe the transformed random variable $Z_2$ as follows:

$$B_{12}Z_1+b_{12}. \quad \text{Eq. 10}$$

As an example, if the random variables Z represent RGB color vectors, the covariance matrices may be described as follows:

$$\sigma_1=\begin{bmatrix}1 & 0 & 0\\ 0 & \varepsilon & 0\\ 0 & 0 & \varepsilon\end{bmatrix}, \text{ and} \quad \text{Eq. 11}$$

$$\sigma_2=\begin{bmatrix}\varepsilon & 0 & 0\\ 0 & \varepsilon & 0\\ 0 & 0 & 1\end{bmatrix}, \quad \text{Eq. 12}$$

where "$\epsilon$" is a relatively small number. Therefore, the initial distribution has various shades of red colors; and the final distribution has various shades of blue colors. For purposes of simplicity, it may be assumed that the means are zero means, for which case the most straightforward transformation is set forth below:

$$B_{12}=\sigma_2\sigma_1^{-1}=\begin{bmatrix}\varepsilon & 0 & 0\\ 0 & 1 & 0\\ 0 & 0 & \varepsilon^{-1}\end{bmatrix}. \quad \text{Eq. 13}$$

The transformation that is set forth in Eq. 13 ensures that the transformed variable $Z_2$ has a covariance matrix $\sigma_2$. However, this exemplary transformation significantly compresses the red color axis (by a factor of $\epsilon$) and significantly expands the blue axis (by a factor of $\epsilon^{-1}$). Therefore, the following transformation may alternatively be used:

$$B_{12}=\begin{bmatrix}0 & 0 & 1\\ 0 & 1 & 0\\ 1 & 0 & 0\end{bmatrix}. \quad \text{Eq. 14}$$

The transformation that is set forth in Eq. 14 does not lead to any stretching or compression in the color axes and is valid for $\epsilon=0$.

The affine transformation that is set forth in Eq. 10, in accordance with exemplary implementations, is computed in a manner that preserves both the structure of the random variable $Z_1$ as well as minimizes the compression or stretching of the color axes. With the structure preservation, the two natural properties of moments and orthogonality of the principal directions are preserved, in accordance with example implementations. Regarding the preservation of the first two moments, the mean $\mu_2$ matches the desired mean, as set forth below:

$$\mu_2=E[Z_2]=B_{12}E[Z_1]+b_{12}=B_{12}\mu_1+b_{12}. \quad \text{Eq. 15}$$

In other words, the following relationships are satisfied:

$$b_{12}=\mu_2-B_{12}\mu_1, \text{ and } Z_2=Ø(Z_1)=B_{12}(Z_1-\mu_1)+\mu_2. \quad \text{Eq. 16}$$

Moreover, the covariance matrix matches the desired covariance matrix, as described below:

$$\begin{aligned}\sigma_2 &= E[(Z_2-\mu_2)(Z_2-\mu_2)^T] \\ &= E[B_{12}(Z_1-\mu_1)(Z_1-\mu_1)^TB_{12}^T] \\ &= B_{12}\sigma_1B_{12}^T,\end{aligned} \quad \text{Eq. 17}$$

where "T" represents the transposition operator.

To preserve the orthogonality of the principal directions, the principal directions of the covariance matrix $\sigma_1$ are preserved. Specifically, the orthogonality of the principal directions are preserved under the transformation ø. More specifically, $U_1D_1U_1^T$ is assumed to be the eigendecomposition of the covariance matrix $\sigma_1$, such that the principal directions are the columns of the matrix $U_1$. Then, due to structural preservation, $B_{12}U_1$ is an orthogonal, though not orthonormal, matrix. Thus, $(B_{12}U_1)^T(B_{12}U_1)$ is diagonal.

For purposes of minimizing the stretching or compression of the color axes, the amount of stretching or compression is measured in terms of the singular values of the matrix $B_{12}$. In particular, denoting the singular values of $B_{12}$ by "$s_i(B_{12})$," the stretch of the transformation (called "$\Theta(Ø)$") may be defined as follows:

$$\Theta(Ø)=\Theta(B_{12})=\sum_{i=1}^{3}\theta(s_i(B_{12})), \quad \text{Eq. 18}$$

where "$\theta(s)$" punishes values that are far away from one, i.e., values that compress or expand the color axes. Among the possibilities for $\theta$ are the following:

$$\theta(s)=|\log(s)|, \text{ and} \quad \text{Eq. 19}$$

$$\theta(s)=\max\{s,s^{-1}\}=e^{|\log(s)|}. \quad \text{Eq. 20}$$

It is noted that where one of the covariance matrices is singular or nearly singular, a robust version of the stretch penalty may be used, such as the following:

$$\theta_\gamma(s) = \min\{\theta(s), \theta_0\}, \quad \text{Eq. 21}$$

In this manner, if $\theta(s)$ is determined pursuant to Eq. 20, then, $\theta_0$ may be set equal to ten, as a non-limiting example.

Using the properties described above, the following optimization may be used:

$$\min_{B_{12}} \Theta(B_{12}) \text{ subject to } B_{12}\sigma_1 B_{12}^T = \sigma_2 \quad \text{Eq. 22}$$

$$\text{and } (B_{12}U_1)^T(B_{12}U_1) \text{ is diagonal.}$$

The solution to the optimization that is set forth in Eq. 22 is contained in the following theorem:

Let $\sigma_k = U_1 D_1 U_1^T$ and let $d_{k;i} = (D_k)_{ii}$ for k=1, 2 and i=1, 2, 3. Then the solution to (Eq. 22) is $B_{12}^* = U_2 S_{12} P_{12} U_1^T$, where $P_{12}$ is a permutation matrix, corresponding to the permutation $\pi$, which solves $$\min_\pi \sum_{i=1}^{3} \theta\left((d_{2,i}/d_{1,\pi(i)})^{\frac{1}{2}}\right)$$

This is an instance of the assignment problem, which can be solved, e.g., by the technique disclosed in J. Munkres, "Algorithms For The Assignment and Transportation Problems," J. Siam, pages 32-38, 1957.

$S_{12}$ is a diagonal matrix whose $ii^{th}$ entry is $(d_{2;i} = d_{1;\pi(i)})$ 1=2 (where $\pi$ is as above).

The determination of the transformation ø using the above-described structure preservation and stretch minimization is referred to as the "Stretch-Minimizing Structure-Preserving (SMSP) transformation" herein. It is noted that the SMSP transformation is relatively easy to determine, using diagonalization and singular value decomposition of small (3×3) matrices, as well the solution of a relatively small assignment problem (again using relatively small 3×3 matrices).

As described above, the discrete color flows $f_{ij}$ map the discrete target color distribution to the discrete source color distribution. This discrete color flow transformation is transformed into a continuous color flow transformation using the above-described SMSP transformations as follows:

In general, the normalized flow for each target bin i and each source bin j is viewed as probability distributions, which identify the mapping between the target and source colors. The normalized flows lead to the definition of pairs of random variables for each target bin i. The mapping between the source random variable to the target random variable is accomplished using an SMSP transformation.

The normalized target (Eq. 23) and source (Eq. 24) flows are set forth below:

$$p_{ij}^{ts} = \frac{f_{ij}}{\sum_{j'} f_{ij'}}, \text{ and} \quad \text{Eq. 23}$$

$$p_{ij}^{ts} = \frac{f_{ij}}{\sum_{i'} f_{i'j}}. \quad \text{Eq. 24}$$

The normalized target flow provides the distribution of source colors corresponding to the $i^{th}$ target color. In a similar fashion, the normalized source flow provides the distributions of target colors corresponding to the $j^{th}$ source color. These normalized flows are used to determine statistics, i.e., means and covariance matrices, of a pair of vector random variables associated with the $i^{th}$ target color.

First discussed below is the source random variable, which is associated with target bin i. The distribution of source bins associated with target color i is the normalized source flow called "$p_{ij}^{ts}$." The statistics of the source random variable associated with bin i, which are the mean $\tilde{\mu}_i^s$ and covariance matrix $\tilde{\sigma}_i^s$ are then determined. The mean and second moment associated with each source bin may be described as follows:

$$\mu_j^s = E[s|s \in \text{bin}_j], \text{ and} \quad \text{Eq. 25}$$

$$v_j^s = E[ss^T|s \in \text{bin}_j]. \quad \text{Eq. 26}$$

In practice, $\mu_j^s$ and $v_j^s$ are determined from the samples within bin j in the standard way. The statistics of the source colors associated with bin i may then be determined as follows:

$$\tilde{\mu}_i^s = \sum_j p_{ij}^{ts} \mu_j^s, \text{ and} \quad \text{Eq. 27}$$

$$\tilde{\sigma}_i^s = \sum_j p_{ij}^{ts} v_j^s - \tilde{\mu}_i^s (\tilde{\mu}_i^s)^T. \quad \text{Eq. 28}$$

Regarding the target random variable associated with target bin i, the distribution of target bins associated with target color i are first examined. The normalized target flow $p_{ij}^{ts}$ indicates that the source bins j associated with target bin i; but for each source bin j, the normalized source flow $p_{ji}^{st}$ indicates the target bins i associated with that bin. Thus, the normalized target and source flows are combined to understand which target bins are related. In this context, "related" means that the target bins map to the same source bins j. Specifically, this is set forth below:

$$p_{ii'}^{tt} = \sum_j p_{ij}^{ts} p_{ji'}^{ts}, \quad \text{Eq. 29}$$

or in matrix notation $p^{tt} = p^{ts} p^{st}$. This distribution relates target bin i to target bin i'. Here, $p_{ii}$ is relatively large if target bins i and i' map to similar source bins and relatively small if this is not the case. The $p^{tt}$ matrix is a stochastic matrix.

Given $p_{ii}^{tt}$, the statistics of the target random variable associated with bin i are then determined, i.e., the covariance matrix $\tilde{\sigma}_i^t$ and the mean matrix $\tilde{\mu}_i^t$ are determined. This process is the same as the case for source statistics. If it is assumed that the mean and second moment are associated with each target bin, then the following relationships are obtained:

$$\mu_i^t = E[t|t \in \text{bin}_i], \text{ and} \quad \text{Eq. 30}$$

$$v_i = E[ss^T|y \in \text{bin}_i]. \quad \text{Eq. 31}$$

In practice, $\mu_i^t$ and $v_i^t$ are computed from the samples within bin i in the standard way. Then, statistics of the target colors associated with bin i are determined as follows:

$$\tilde{\mu}_i^t = \sum_{i'} p_{ii'}^\eta \mu_{i'}^t, \text{ and} \quad \text{Eq. 32}$$

$$\tilde{\sigma}_i^t = \sum_{i'} p_{ii'}^\eta v_{i'}^t - \tilde{\mu}_i^t (\tilde{\mu}_i^t)^T, \quad \text{Eq. 33}$$

Given the above-described determination of the pairs of random variables for each target bin i, the optimal transformation for bin i is next determined. In particular, a distribution with mean and covariance matrix $(\mu_i^t, \sigma_i^t)$ is transformed to a mean and covariance matrix $(\mu_i^s, \sigma_i^s)$. To do so, the resulting transformation, called "$\psi_i(t)$" is disclosed herein and is described as follows:

$$\psi(t) = \sum_{i=1}^{n_i} w_i(t) \psi_i(t), \quad \text{Eq. 34}$$

where the non-negative weights "$w_i(t)$" sum to one. In other words, $$\sum_i w_i(t) = 1, \text{ with } w_i(t_i) = 1.$$

The overall transformation $\psi_i(t)$ interpolates the bin-by-bin transformations $\psi_i(t)$. In accordance with exemplary implementations, the weights $w_i(t)$ may be determined as follows:

$$w_i(t) = \frac{d(t, t_i)^{-\alpha}}{\sum_{i'} d(t, t_{i'})^{-\alpha}}, \quad \text{Eq. 35}$$

where "d" represents the distance between two target colors and "$\alpha$" is greater than zero. An interesting property of this algorithm occurs when the smoothness weight γ goes to infinity (∞) in the computation of the color flow in the smoothed relaxation problem. If $(\mu_{tot}^s, \sigma_{tot}^s)$ is assumed to be the mean and covariance matrix of the entire collection of source vectors (i.e., ignoring the histogram bins and simply pooling all source vectors together) and likewise for $(\mu_{tot}^t, \sigma_{tot}^t)$ then the following holds true:

Let the color flow $f_{ij}$ be computed as the solution to the Smoothed Relaxed Transportation Problem, with η=1 and γ→∞. Then the color transformation $\psi(t)$ is the SMSP transformation from the random variable with mean and covariance matrix $\mu_{tot}^t, \sigma_{tot}^t$ to the random variable with mean and covariance matrix $\mu_{tot}^s, \sigma_{tot}^s$ The above-recited theorem is quite useful, as it states that as the smoothness term becomes the dominant term, the transformation approach is the transformation that is achieved by considering the source and target distributions to be unimodal.

Figure 4:
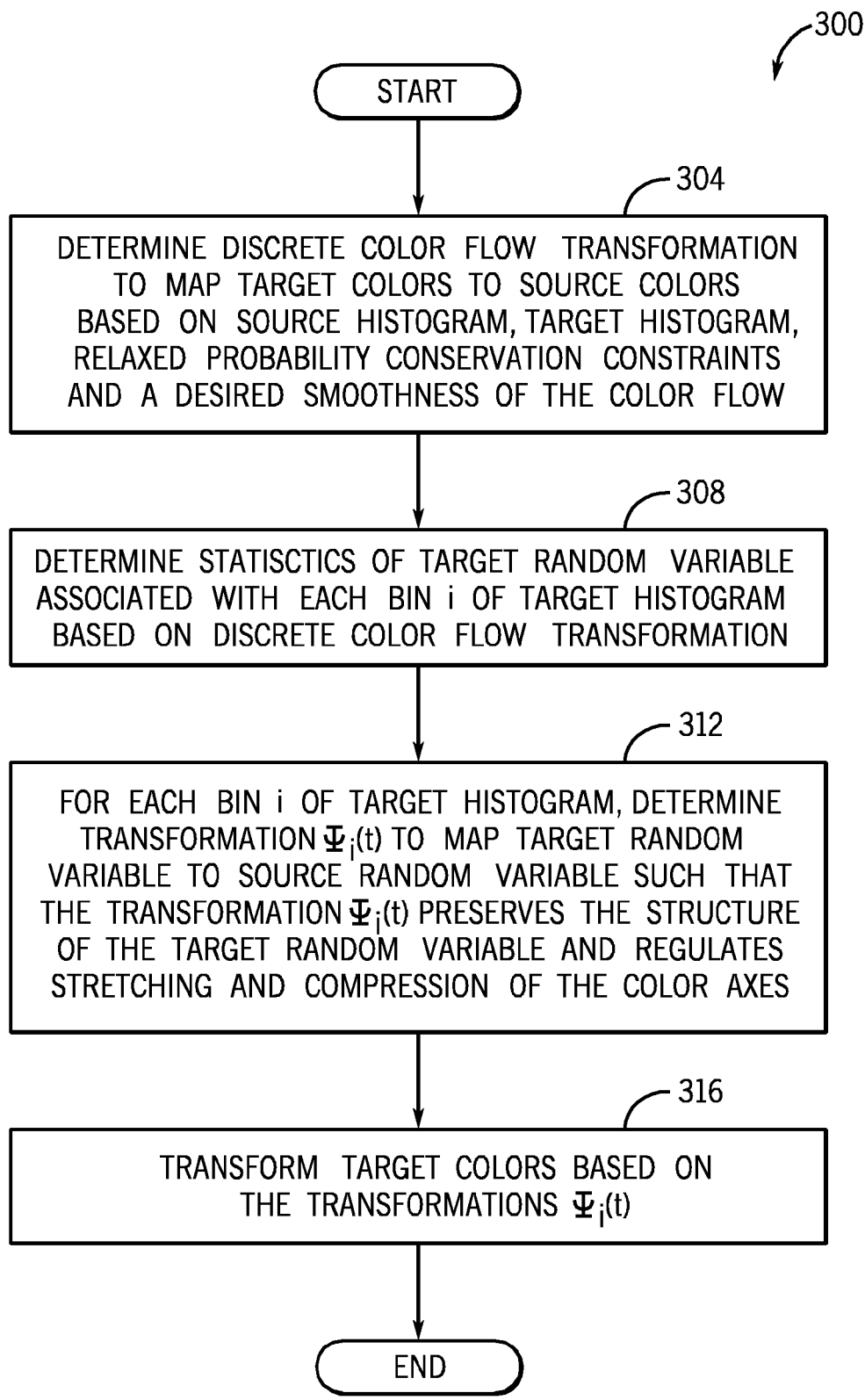

To summarize, in accordance with an example implementation, a technique 300 that is depicted in FIG. 4 may be used for purposes of mapping colors from a source object to a target object. Pursuant to the technique 300, a discrete color flow transformation is determined (block 304) to map target colors to source colors based on a source histogram, a target histogram, relaxed probability conservation constraints and a desired smoothness of the color flow. Next, the technique 300 includes determining (block 308), for each bin i of target histogram, statistics of a target random variable associated with the bin i based on the discrete color flow transformation. For each bin i of the target histogram, the technique 300 includes determining (block 312) a transformation to map the target random variable to the source random variable such that the transformation preserves the structure of the target random variable and regulates stretching and compression of the color axes. Finally, the technique 300 includes transformation (block 316) the target colors based on the determined transformations.

Figure 3:
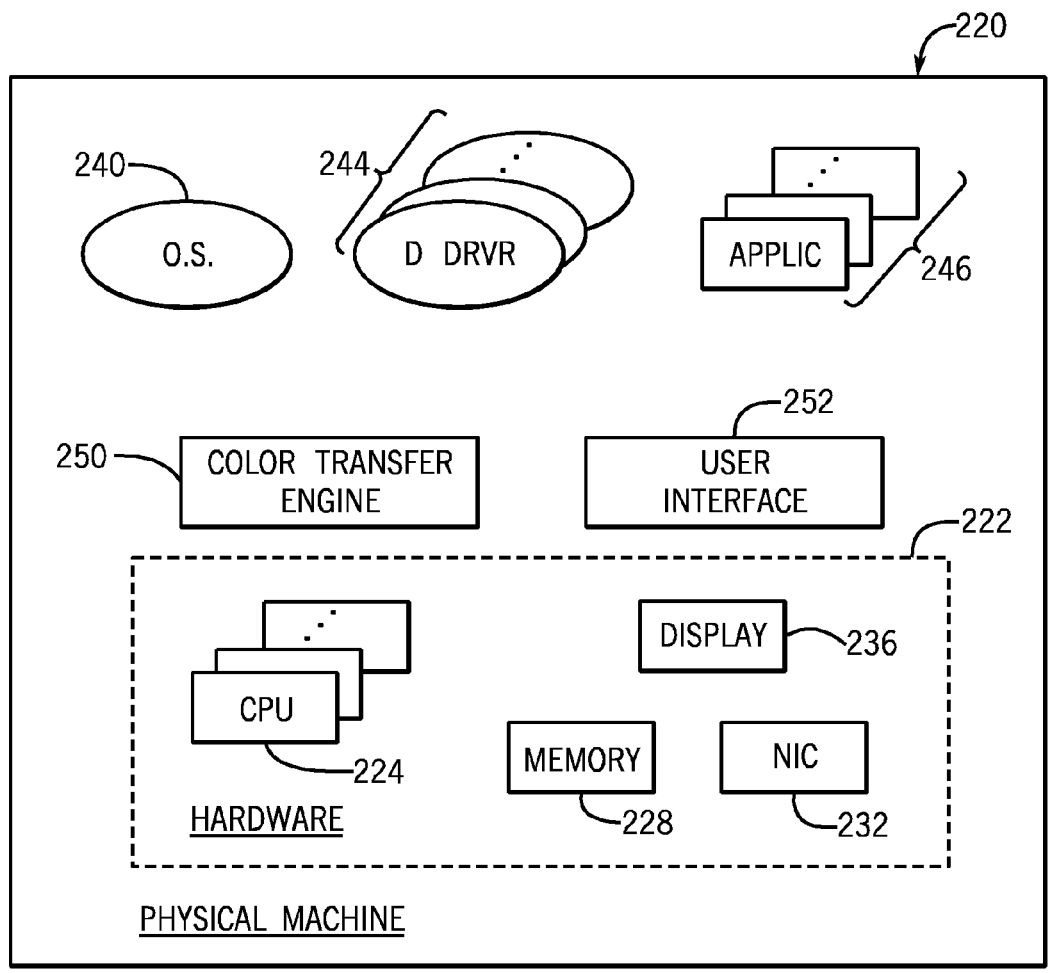
FIG. 3 is a schematic diagram of a physical machine according to an example implementation.

Referring to FIG. 3, in accordance with example implementations, the systems and techniques that are disclosed herein may be implemented in, for example, a system that includes at least one physical machine 220. In this context, a "physical machine" indicates that the machine is an actual machine made up of executable program instructions and hardware. Examples of physical machines include computers (e.g., application servers, storage servers, web servers, etc.), communications modules (e.g., switches, routers, etc.) and other types of machines. The physical machine(s) may be located within one cabinet (or rack), or alternatively, the physical machine(s) may be located in multiple cabinets (or racks).

In accordance with a specific example that is disclosed herein, the physical machine 220 contains machine executable program instructions and hardware 222 that executes the instructions for purposes of implementing all or parts of the color transformation system 10 (see FIG. 1), i.e., transferring color from a source image to a target image, using all or selected parts of the techniques 200 (see FIG. 2) and/or 300 (see FIG. 4), which are disclosed herein. In some implementations, execution of the machine executable instructions causes the physical machine 220 to create a color transfer engine 250 for purposes of performing all or parts of one or more of the exemplary techniques that are disclosed herein, such as the techniques 200 and/or 300. In this manner, color transfer engine 250 may cause the physical machine 220 to provide a user interface 252 that allows a user to select regions of the target and source images to be segmented, thereby facilitating the generation of seed values for determining the colors of source and target objects; determine corresponding histograms of source and target colors; determine a discrete color flow transformation to map target colors to source colors; determine a continuous color flow transformation to map target colors to source colors; transform colors of a target object based on a determined continuous color flow transformation; etc.

It is noted that FIG. 3 is merely an example of an architecture that might be used to perform the color transfer techniques that are disclosed herein. In this regard, an architecture to perform the techniques that are disclosed herein may include one or multiple additional physical machines 220. Thus, all or part of any of the techniques that are disclosed herein, such as the techniques 200 and 300, may be implemented on a single physical machine or on more than two physical machines, depending on the particular implementation. Moreover, although the physical machine 220 is depicted in FIG. 3 as being contained within a box, it is noted that the physical machine 220 may be a distributed machine having multiple nodes, which provide a distributed and parallel processing system.

Regarding more specific details of an exemplary implementation, the machine executable instructions of the physical machine 220 may include one or multiple applications 246, an operating system 240 and one or multiple device drivers 244 (which may be part of the operating system 240). In general, the machine executable instructions of the physical machine 220 may be stored in non-transitory storage, such as in a memory 228 of the physical machine 220. In this manner, the machine executable instructions may be stored in a non-transitory medium or non-transitory media, such as in system memory, in a semiconductor memory, in removable storage, in optical storage, in magnetic storage, in non-removable storage, in storage separate (local or remote) from the physical machine 220, etc., depending on the particular implementation. The memory 228 may also store data indicative of the source and target images; histograms describing color distributions in these images; data indicating results of segmentation; data indicative of the discrete color flow transformation; data indicative of statistics; data indicative of a continuous color flow transformation; etc., depending on the particular implementation.

In addition to the memory 228, the hardware 222 of the physical machine 220 includes one or multiple processors that execute the machine executable instructions, such as one or multiple central processing units (CPUs) and/or one or multiple processing cores of the CPU(s) 224. The hardware 222 may contain various other components, such as a network interface card (NIC) 232 and a display 236 to allow a user to select objects of the source and target images for segmentation; view the results of the color transfer in the corresponding transformed object; etc.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
using a processor-based machine to determine a discrete color flow transformation to map target colors of a target object to source colors of a source object based at least in part on a first histogram indicating a color distribution of the target object and a second histogram of a color distribution indicating the source object;
determining a continuous color flow transformation to map the target colors to the source colors based at least in part on the discrete color flow transformation; and
transforming the target colors of the target object to generate a third object based at least in part on the continuous color flow transformation.

2. The method of claim 1, wherein the act of using the processor-based machine to determine the discrete color flow transformation comprises not completely conserving probability for the color distributions.

3. The method of claim 1, wherein the act of using the processor-based machine to determine the discrete color flow transformation comprises determining a plurality of color flows interrelating bins of the first histogram to bins of the second histogram and regulating a smoothness of the discrete transformation to cause flows for substantially similar colors of the target object to be substantially the same.

4. The method of claim 1, wherein the act of determining the continuous color flow transformation comprises determining the continuous color flow transformation based at least in part on statistics associated with bins of the first histogram.

5. The method of claim 4, further comprising determining the statistics, the determining comprising:
for each bin of the first histogram, determining first statistics of a random variable associated with the bin and associated with the target object, based on the discrete color flow transformation; and
for each bin of the first histogram, determining second statistics of a random variable associated with the bin and associated with the source object, based on the discrete color flow transformation.

6. The method of claim 5, wherein the act of determining the continuous color flow transformation comprises:
for each bin, determining a transform interrelating the random variable associated with the bin and associated with the target object to the random variable associated with the bin and associated with the source object.

7. The method of claim 6, wherein the act of determining the transforms comprises preserving a structure associated with each of the random variables associated with the target object.

8. The method of claim 6, wherein the act of determining the transforms comprises regulating stretching of color axes introduced by the transforms.

9. A system comprising:
a memory to store data indicative of a first histogram indicating a color distribution of a target object and a second histogram indicating a color distribution of a source object; and
at least one processor-based engine to:
determine a discrete color flow transformation to map target colors of the target object to source colors of the source object based at least in part on the first and second histograms;
determine a continuous color flow transformation to map the target colors to the source colors based at least in part on the discrete color flow transformation; and
transform the target colors of the target object to generate a third object based at least in part on the continuous color flow transformation.

10. The system of claim 9, wherein engine is adapted to not completely conserve probability for the color distributions in the determination of the discrete color flow transformations.

11. The system of claim 9, wherein the engine is adapted to determine a plurality of color flows interrelating bins of the first histogram to bins of the second histogram and to regulate a smoothness of the discrete transformation to cause flows for substantially similar colors of the target object to be substantially the same.

12. The system of claim 9, wherein the engine is adapted to:
for each bin of the first histogram, determine first statistics of a random variable associated with the bin and associated with the target object, based on the discrete color flow transformation; and
for each bin of the first histogram, determine second statistics of a random variable associated with the bin and associated with the source object, based on the discrete color flow transformation.

13. The system of claim 12, wherein the engine is adapted to:
for each bin, determine a transform interrelating the random variable associated with the bin and associated with the target object to the random variable associated with the bin and associated with the source object.

14. The system of claim 12, wherein the engine is adapted to:
preserve a structure associated with each of the random variables associated with the target object; and
regulate stretching of color axes introduced by the transforms.

15. An article comprising a machine readable storage medium storing instructions that when executed by at least one processor cause said at least one processor to:

determine a discrete color flow transformation to map target colors of a target object to source colors of a source object based at least in part on a first histogram indicating a color distribution of the target object and a second histogram indicating a color distribution of the source object;

determine a continuous color flow transformation to map the target colors to the source colors based at least in part on the discrete color flow transformation; and transform the target colors of the target object to generate a third object based at least in part on the continuous color flow transformation.

16. The article of claim 15, the storage medium storing instructions that when executed by said at least one processor cause said at least one processor to determine a plurality of color flows interrelating bins of the first histogram to bins of the second histogram and to regulate a smoothness of the discrete transformation to cause flows for substantially similar colors of the target object to be substantially the same.

17. The article of claim 15, the storage medium storing instructions that when executed by said at least one processor cause said at least one processor to:

for each bin of the first histogram, determine first statistics of a random variable associated with the bin and associated with the target object, based on the discrete color flow transformation; and for each bin of the first histogram, determine second statistics of a random variable associated with the bin and associated with the source object, based on the discrete color flow transformation.

18. The article of claim 17, the storage medium storing instructions that when executed by said at least one processor cause said at least one processor to:

for each bin, determine a transform interrelating the random variable associated with the bin and associated with the target object to the random variable associated with the bin and associated with the source object.

19. The article of claim 18, the storage medium storing instructions that when executed by said at least one processor cause said at least one processor to:

selectively weight the transforms to generate the third object.

20. The article of claim 18, the storage medium storing instructions that when executed by said at least one processor cause said at least one processor to:

preserve a structure associated with each of the random variables associated with the target object; and regulate stretching of color axes introduced by the transforms.

* * * * *